(12) United States Patent
Powell

(10) Patent No.: US 7,378,624 B2
(45) Date of Patent: May 27, 2008

(54) METHOD OF WELDING A COMPONENT INSIDE A HOLLOW VESSEL

(75) Inventor: Patrick Powell, Farmington Hills, MI (US)

(73) Assignee: DENSO International America, Inc., Southfield, MI (US)

(*) Notice: Subject to any disclaimer, the term of this patent is extended or adjusted under 35 U.S.C. 154(b) by 204 days.

(21) Appl. No.: 11/056,069

(22) Filed: Feb. 11, 2005

(65) Prior Publication Data

US 2006/0191909 A1 Aug. 31, 2006

(51) Int. Cl.
H05B 6/10 (2006.01)
H05B 6/00 (2006.01)

(52) U.S. Cl. ...................... 219/633; 219/618

(58) Field of Classification Search ........... 219/633, 219/618, 634, 632
See application file for complete search history.

(56) References Cited

U.S. PATENT DOCUMENTS

| | | | |
|---|---|---|---|
| 3,858,026 A | 12/1974 | Edwards et al. | |
| 3,941,641 A * | 3/1976 | Heller et al. | 156/272.4 |
| 4,035,547 A * | 7/1977 | Heller et al. | 428/329 |
| 4,070,147 A | 1/1978 | Sikora et al. | |
| 4,246,461 A | 1/1981 | Jeppson | |
| 4,571,472 A | 2/1986 | Pollack et al. | |
| 4,728,760 A | 3/1988 | Brolin et al. | |
| 4,947,462 A | 8/1990 | Moe | |
| 5,066,846 A | 11/1991 | Pirl | |
| 5,352,517 A * | 10/1994 | Clough et al. | 428/357 |
| 5,435,478 A | 7/1995 | Wood et al. | |
| 5,573,683 A | 11/1996 | Findlan et al. | |
| 5,641,422 A | 6/1997 | Matsen et al. | |
| 5,814,175 A | 9/1998 | Rau et al. | |
| 6,010,552 A * | 1/2000 | Gasperetti et al. | 75/10.16 |
| 6,056,844 A * | 5/2000 | Guiles et al. | 156/272.4 |
| 6,229,122 B1 | 5/2001 | Assen | |
| 6,364,197 B1 | 4/2002 | Oelgoetz et al. | |
| 6,423,953 B1 * | 7/2002 | Johnson, Jr. | 219/634 |
| 6,677,559 B2 * | 1/2004 | Johnson, Jr. | 219/634 |
| 2004/0009042 A1 | 1/2004 | Belloni et al. | |

* cited by examiner

Primary Examiner—Daniel L Robinson
(74) Attorney, Agent, or Firm—Harness, Dickey & Pierce, PLC

(57) ABSTRACT

A method of welding plastic components using an induction weldable plastic material to a wall of a hollow plastic vessel entails providing a metal disk to a first plastic component, providing the first plastic component with a weldable plastic material, inserting the plastic component through a hole in a wall of the hollow plastic vessel, the inserting being from an exterior of the vessel to an interior of the vessel, positioning the first plastic component against or proximate an interior wall of the hollow plastic vessel, orienting an electro-magnet about the exterior of the vessel, orienting an induction coil about the electro-magnet such that the induction coil encircles the electromagnet; energizing the electro-magnet so that the metal disk of the first plastic component is secured against the wall of the vessel, and energizing the induction coil so that the induction weldable plastic material welds to the vessel wall.

15 Claims, 4 Drawing Sheets

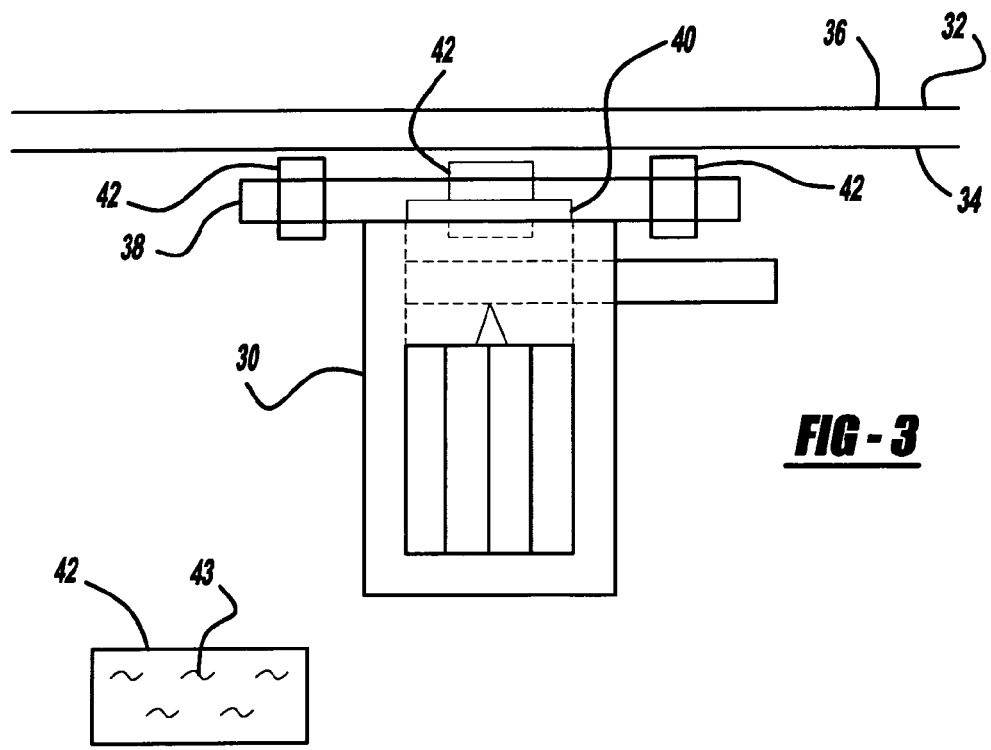
FIG - 3
FIG - 3a
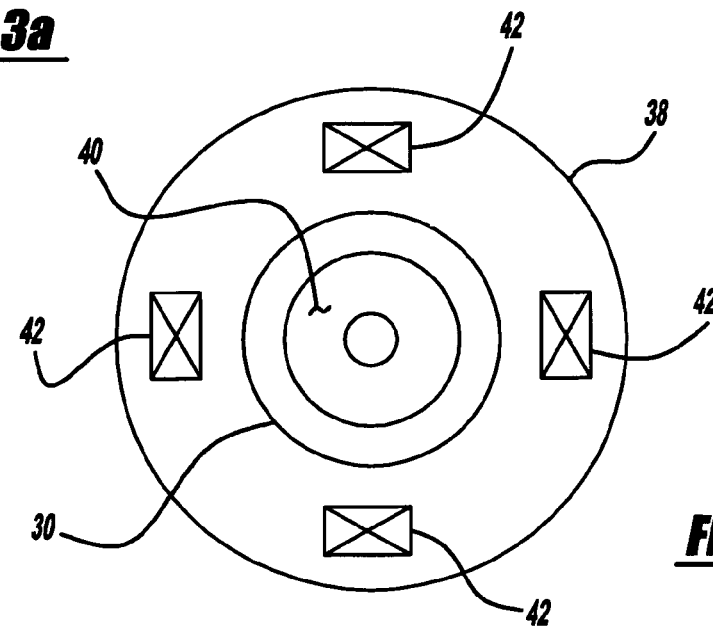
FIG - 4

METHOD OF WELDING A COMPONENT INSIDE A HOLLOW VESSEL

FIELD OF THE INVENTION

The present invention relates to a method of welding and more specifically, to a method of welding a plastic device piece to the interior surface of a plastic hollow vessel.

BACKGROUND OF THE INVENTION

Traditionally, metal automobile fuel tanks have components attached to their interior surfaces to provide a variety of functions. For example, fuel pump modules pump liquid fuel from the fuel tank and vapor vent valves vent gaseous fumes from the fuel tank. In such situations, these traditionally metal components are attached to an interior surface of the fuel tank using traditional fasteners such as bolts or screws that pass through holes in the tank wall, and may necessitate holes in the components themselves. While this method of fastening components to a wall of the fuel tank has generally served its purpose, it has not been without its share of limitations.

For instance, using fasteners to attach components to the interior surface of the fuel tank necessitates the use of bolts, screws or other fasteners, which adds to the total number of parts and the overall cost of the fuel tank assembly. Additionally, using traditional fasteners to mount internal fuel tank components results in the drilling of holes in the fuel tank through which the fasteners must pass to secure the component to the tank wall. Furthermore, because the fasteners pass through the fuel tank wall, an additional device such as a seal is normally required around the fastener in some fashion in order to retain the fuel within the fuel tank. Another disadvantage of securing components with traditional fasteners is that mounting components with traditional fasteners means that the connection is not permanent and may be a source of noise, vibration and harshness. Yet another disadvantage is that securing components within a fuel tank using traditional fasteners takes multiple fastening steps thereby increasing the time necessary to fasten such components.

What is needed then is a component fastening method that does not suffer from the above disadvantages. This, in turn will provide a fastening method that does not utilize traditional fasteners, that utilizes a lower number of parts than traditional fastening methods, that does not necessitate the use of additional seals, and that results in a permanent connection.

SUMMARY OF THE INVENTION

A method of welding a plastic component using induction weldable plastic materials to a wall of a hollow vessel entails providing a metal disk to a first plastic component and providing the first plastic component with a weldable plastic material. Next, the plastic component is inserted through a hole defined by a wall of the hollow plastic vessel, also known as the second plastic vessel, the inserting being from an exterior of the vessel to an interior of the vessel. The first plastic component is positioned against an interior wall of the hollow plastic vessel and then an electro-magnet is oriented about the exterior of the vessel such that the orienting of the electro-magnet is opposite the first plastic component, which is still in the interior of the hollow vessel, with the vessel wall positioned therebetween.

An induction coil is oriented about the electro-magnet such that the induction coil encircles the electro-magnet while energizing the electro-magnet causes the metal disk of the first plastic component to be drawn toward and secure against the interior vessel wall. The induction coil is energized so that the induction weldable plastic material welds to the vessel wall. The induction weldable plastic material contains a resistive material, such as a metal, that generates heat in response to the energization of the induction coil. The energization of the electro-magnet is maintained until the first plastic component and the hollow plastic vessel are room temperature or some temperature relatively lower than the weld temperature, which ensures a secure weld by maintaining the attraction force of the component against the vessel wall.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is an enlarged side view of the device of FIG. 2 in its position just before being welded to the interior wall of the fuel tank;

FIG. 3a is an enlarged view of an induction weld plastic material with internal electromagnetic materials;

FIG. 4 is a top view of the device prior to being welded to the interior of the fuel tank depicting example locations of an induction weld plastic material;

DETAILED DESCRIPTION OF THE PREFERRED EMBODIMENTS

The following description of the preferred embodiments is merely exemplary in nature and is in no way intended to limit the invention, its application, or uses. With reference to FIGS. 1 through 8, a method of welding a component inside a hollow vessel via induction heating in accordance with the teachings of the present invention will be described. The welding method of the teachings of the present invention is primarily for welding plastic components together. For example, for welding a first plastic component to a second plastic component. Normally the type or kind of plastic of the two components is the same in order to facilitate consistent bonding of the parts. However, the type of plastic does not necessarily have to be the same, but rather only compatible in order to provide a proper weld. Compatibility of the two plastics will also depend upon the bond material, that is, the induction weld plastic material that will be used to join the parts together. As long as the induction weld plastic material is capable of being bonded to each of the two major plastic components individually, then the two plastic components may be joined together with such an induction weld plastic material.

Figure 1:
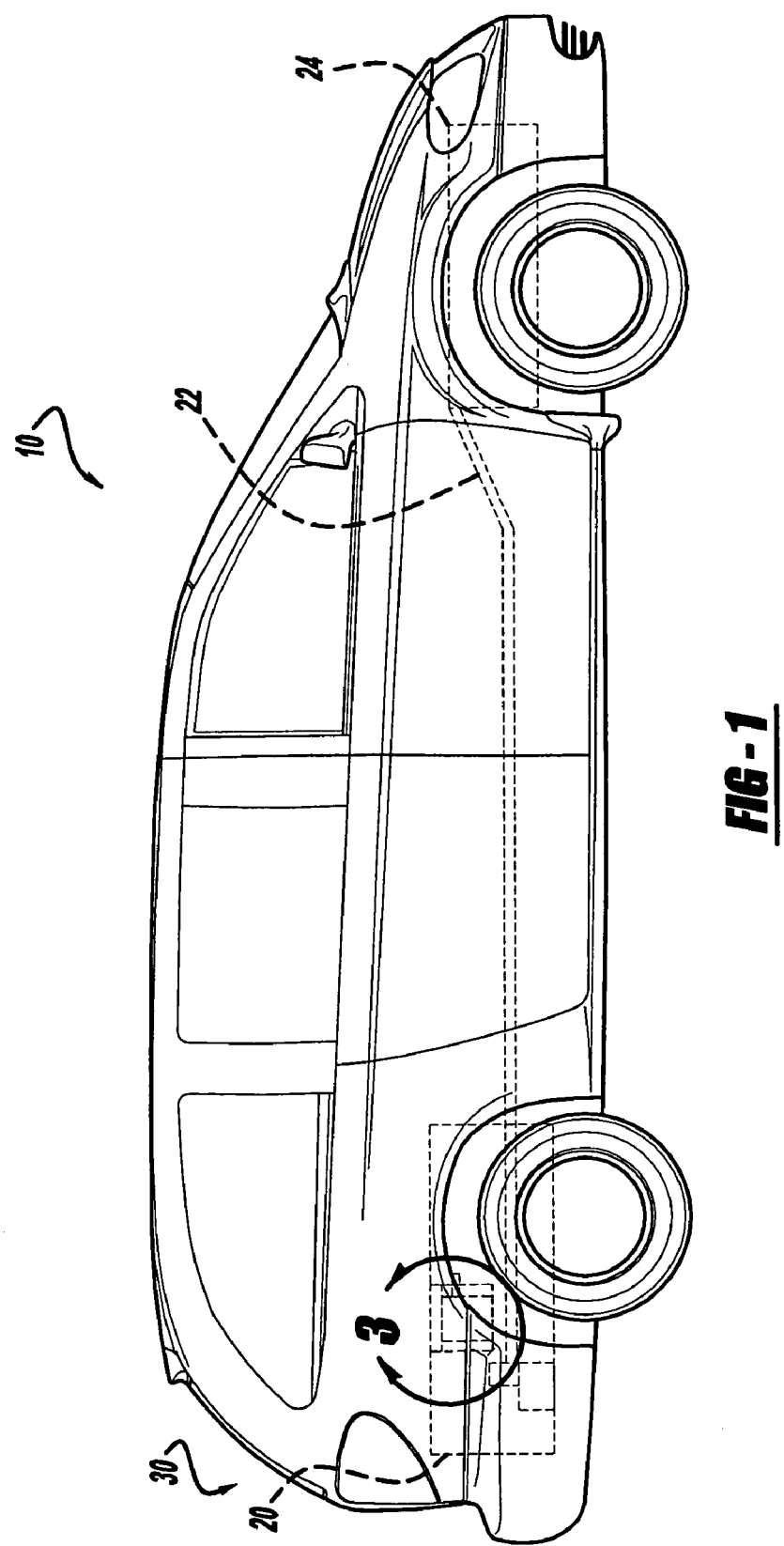
FIG. 1 is a perspective view of an automobile depicting the location of a fuel tank within the automobile.
Figure 2:
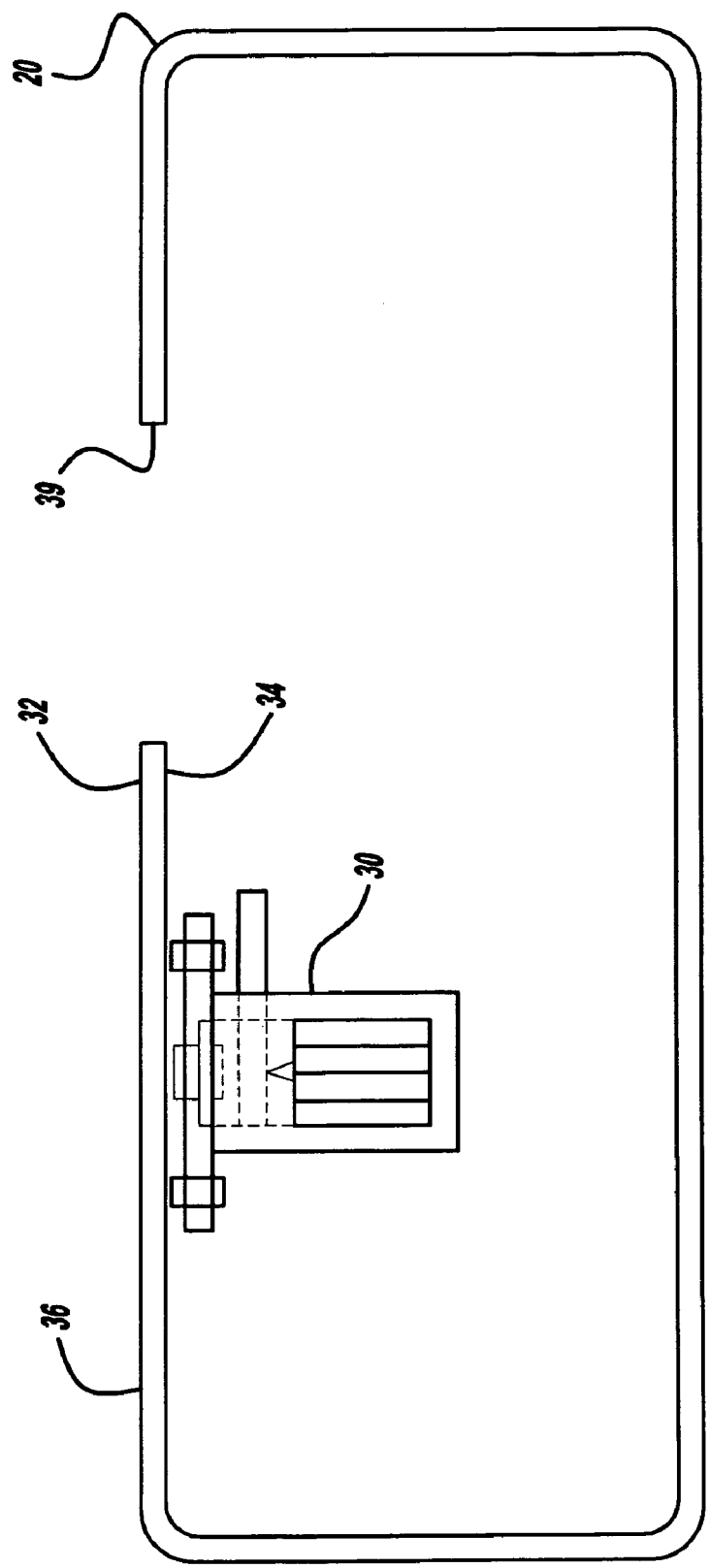
FIG. 2 is a side view of a vehicular fuel tank depicting a location of a device to be welded to the interior wall of the fuel tank.

FIG. 1 is a perspective view depicting the location of a fuel tank 20 within a vehicle 10 such as an automobile. The fuel tank 20 typically supplies fuel to a vehicle engine 24 through a fuel line 22. FIGS. 2 and 3 depict enlarged views of a vapor vent valve 30 within the fuel tank 20. The vapor vent valve 30 is shown suspended from the bottom surface 34 of the top wall 36 of the fuel tank 20. While a vapor vent valve 30 is shown in FIGS. 1-8, any component that is normally resident within a vehicle fuel tank may be used as the representative example of the part to be welded, according to the teachings of the present invention. Furthermore, the part need not necessarily be welded inside of a fuel tank, and actually the parts need only be plastic.

Continuing with the description of the operative parts of the apparatus to be welded to an interior wall of a hollow vessel, the vapor vent valve 30 has a plate 38 that is molded or attached to the top of the vapor vent valve 30. The plate 38 has a collection of feet 42 that are dispersed around the plate's top surface. While the feet 42 may be secured or attached to only the top surface of the plate 38, the feet 42 are shown imbedded into the plate 38. That is, in FIG. 3, the feet 42 are shown as passing through the plate 38. Additionally, while four feet 42 are shown dispersed around the plate 38, any number of feet 42 may be used depending upon the item to be welded to the bottom surface 34 of the top wall 36 of the fuel tank 20. The plate 38 depicted in FIG. 3 is plastic.

The welding method of the teachings of the present invention is for welding plastic parts, in this case the plastic plate 38 to the plastic fuel tank 20. However, the actual component, in this case a vapor vent valve 30, is not required to be plastic, but can be metal or plastic or any combination thereof. Additionally, the feet 42 of the teachings of the present invention, shown in an enlarged view in FIG. 3a, are an induction weldable plastic material laced with metal particles 43. That is, the metal particles 43 are imbedded within the plastic feet 42. The induction welding process of the teachings of the present invention uses induction energy and electromagnetic materials 43 within the plastic feet 42 to precisely deliver heat to, and in and around, the bond line between the plate 38 and the bottom surface 34 of the fuel tank 20. This welding process provides a superior bond between the thermoplastics of the fuel tank 20, the plate 38 and the feet 42 directly involved in the weld.

While FIG. 3 is an enlarged side view of the device of FIG. 2 that is welded to the interior of the fuel tank 20, FIG. 4 is a top view of the device that is weldable to the interior of the fuel tank 20 depicting example locations of the induction weld plastic material 42. FIG. 4 reveals a metal disk 40 that is molded into, or attached to, the mounting flange 38. The metal disk 40 provides the attraction portion that is necessary for a plastic part such as the mounting flange 38 to be attracted to the fuel tank top wall 36 when a magnet, such as an electro-magnet 50 (FIG. 6), is placed on the opposite side of the fuel tank wall 36 as the metal disk 40. The metal disk 40 is situated relative to the mounting flange 38 so that when the electro-magnet 50 is situated over the mounting flange 38, the attraction force is equally distributed about the metal disk 40 to evenly distribute the attraction force to ensure an adequate bond during the welding process.

Now, the method of welding the vapor vent valve 30 to the interior surface of the fuel tank 20 will be explained. Those skilled in the art will appreciate that a vapor vent valve 30 is being used as a representative example of an item to be welded to an interior surface 34 of the interior of the fuel tank 20, but that any similar but appropriate device may be welded to the interior surface of the fuel tank 20.

Figure 5:
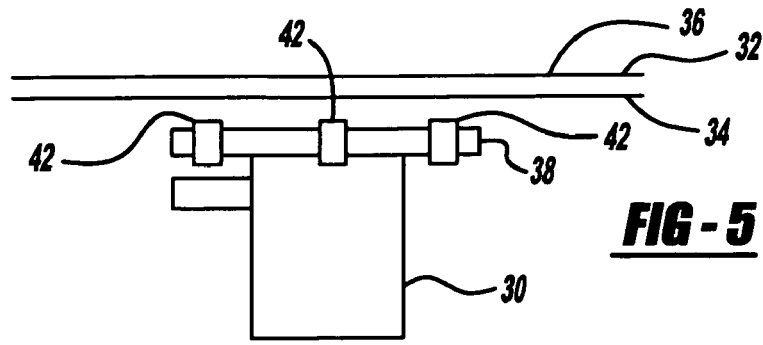
FIG. 5 is a side view of a device in a pre-weld position inside of the fuel tank.

FIG. 5 is a side view of the device 30 in an initial position inside of the fuel tank 20 prior to actual welding of the device. Before being placed into the position shown in FIG. 5, the device 30, again, in this example, a vapor vent valve 30, is lowered or maneuvered in through the hole 39 defined by the top wall 36 of the fuel tank 20 (FIG. 2). The device 30 may be maneuvered by human hand or alternatively, by mechanical means such as a mechanical robot (not shown), as is commonly done in modern assembly line welding applications. FIG. 2 depicts a typical hole 39 through which a device 30 may be maneuvered. While the hole 39 is shown in the top wall 36 in FIG. 2, the hole 39 may be in any wall, considering that the hole 39 will be sealed, such as is the case of the fuel tank 20. Furthermore, while a fuel tank 20 is depicted in particular Figures, one skilled in the art will appreciate that any tank or even surfaces of non-tank structures may be used as the surface to which the device 30 may be welded. Additionally, while the fuel tank 20 is shown with a device welded to a bottom surface 34 of its top wall 36, the device 30 may be welded to the top surface 32 of the top wall 36, or any exterior wall surface.

Figure 6:
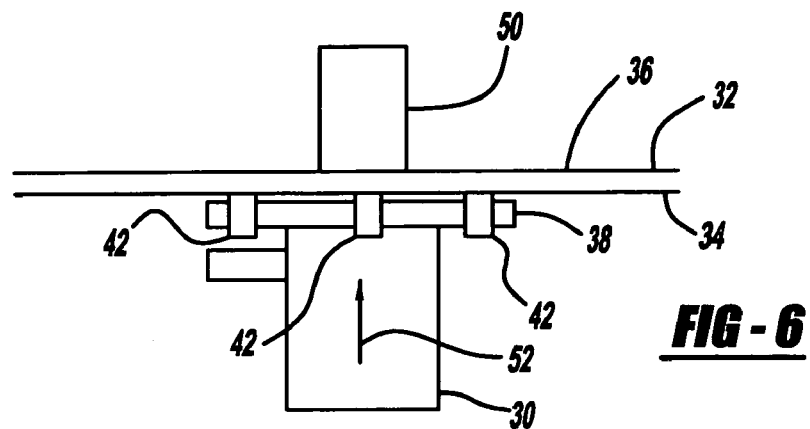
FIG. 6 is a side view of the device being magnetically attracted to the interior wall of the fuel tank prior to its being welded to the fuel tank wall.

Continuing with the method of welding, the device 30 is situated or positioned as shown in FIG. 5 proximate to the top wall 36 of the fuel tank 20. While the device 30 is held by hand or stabilized by a mechanical device, an electromagnet 50 is situated over the device 30 yet on the opposite side of the top wall 36 as the device 30 to be welded, as shown in FIG. 6. Next, the electromagnet 50 is electrically energized (turned on) so that the magnetic disk 40 of the device 30 is drawn to the electromagnet 50. Again, the device is drawn to the electromagnet 50 because the device 30 has a metal disk 40 or plate installed inside or on top of the device 30. The metal disk 40 may be molded within the flange 38, which may be metal or plastic, or attached to the top of the flange 38. The device is drawn to the top wall in the direction of arrow 52 when the electro-magnet 50 is energized.

Figure 7:
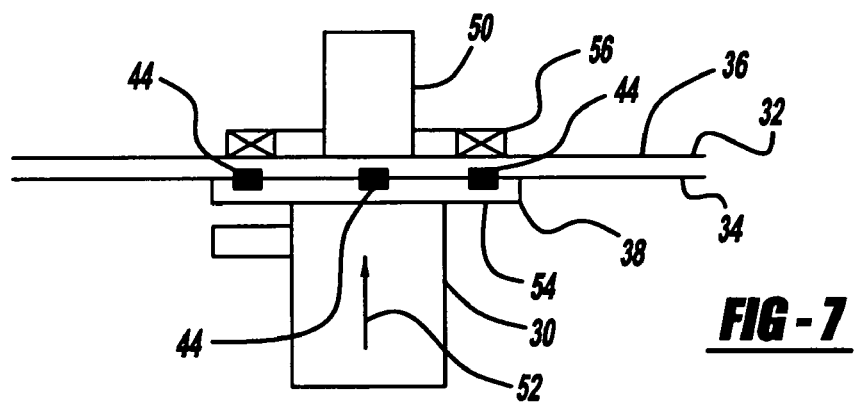
FIG. 7 is a side view of the device in its magnetically attracted position with an induction coil positioned outside of the fuel tank and opposite the item to be welded, with respect to the tank wall.

FIG. 7 depicts the placement of an induction coil 56, which may be circular or ring-shaped, about the electromagnet 50 while the electro-magnet 50 is still energized in order to secure the device 30 against the top wall 36 with a force in accordance with the force arrow 52. Next, the induction coil is 56 energized in order to begin the actual welding process. Alternatively, the induction coil 56 may be placed about the electro-magnet 50 before the electromagnet 50 is energized. Depicted in FIG. 7 as a side view, the induction coil 56 encircles the electro-magnet 50 to provide equal and consistent induction to the weld material 44. At this point, further explanation of the weld material and the weld process is in order.

With reference to FIG. 3a, the feet 42, imbedded with electro-magnetic particles 43, contribute to the welding of the device 30 to the top wall 36. The feet 42 consist of an induction weldable plastic material such as polyethylene (PE). The welding process occurs because of resistivity, that is, the resistivity of the metal particles 43 within the feet 42 generates heat when the induction coil 56 is energized. The heat is caused by eddy currents that surround the induction coil and the electromagnetic particles 43 and cause the electromagnetic particles 43 to become hot. Different metals react in different ways to induced electrical current. Carbon, steel, tungsten and tin have relatively high electrical resistivity, that is, they strongly resist the flow of current. Therefore, these metals will heat more quickly than low-resistivity metals such as aluminum, brass and copper. Selection of the resistive material within the feet 42 depends upon the components to be welded and the type of weld desired. Magnetic materials are easier to heat, that is, they at least heat more quickly, than non-magnetics. This is due to the effects of hysteresis heating. Magnetic materials naturally resist the rapidly changing magnetic fields within and about the induction coil 56. The resulting friction produces its own additional heat, that is, hysteresis heating, in addition to eddy current heating. A metal which offers high resistance is said to have a high magnetic "permeability."

FIG. 7 depicts the induction coil 56 and the electro-magnet 50 in their in-use positions during welding. Furthermore, upon completion of the application of induction heat by the induction coil 56, the electro-magnet 50 is left in place and energized in order to continue the attraction force that the electro-magnet 50 creates in conjunction with the metal disk 40. This continued force, denoted by arrow 52, ensures that even during cooling, an integral and thorough bond is formed between the plate 38, top wall 36 and weld material 44.

While the above method includes the metal disk 40 in order to create an attraction force, the metal disk 40 could be excluded and supplanted by enough induction weldable plastic material in which the magnetic material within the induction weldable plastic material is sufficient to create the attraction force. The induction weldable plastic material, in this instance, may maintain its shape of rectangular or similarly-shaped feet, or be spread over the surface to be welded, such in the fashion of a coating. In yet another possibility, the induction weldable plastic material may actually be part of the components to be welded. In this case, the metal particles are imbedded within the surface of the components to be bonded together and the surfaces of the components melt together during the actual welding.

Figure 8:
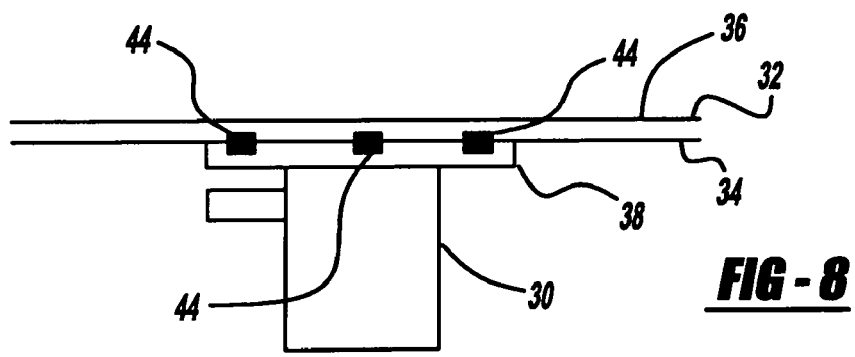
FIG. 8 is a side view of the item in its as-welded position inside of the fuel tank.

FIG. 8 is a side view of the item in its welded position inside of the fuel tank 20 after removal of the induction coil 56 and the electro-magnet 50. At this point the welding process is complete and the flange 38, the top wall 36 and the melted feet 44 are bonded together. FIGS. 7 and 8 depict the melted feet 44 as a darkened mass, although during and after the welding process, the feet 44 may become indistinguishable from the plate 38 and the top wall 36 because they all may be of the same material and the feet 44, plate 38 and top wall 36 all experience melting to the same or similar degrees, thus making their individual appearances indistinguishable from each other.

The advantages of the welding method according to the teachings of the present invention are a consistent and evenly applied weld. That is, the weld provides a consistent, melted juncture between the components to be welded. Additionally, the welding method permits welding in difficult, hard to reach places such as the interior of fuel tanks and within other vessels. Furthermore, the welding method can be applied to all plastic pieces such as the fuel tank 20, flange 38, and weld material 42 discussed above. Additionally, by using the welding method detailed above in applications where bolts and other fasteners requiring holes are normally used, neither drilling of holes in the tank wall 36 nor use of additional, separate fasteners is necessary. Additionally, the bonding of the parts is permanent since the bonded materials are the same and they melt together forming a single plastic piece. Finally, using an induction heating welding method reduces hydro-carbon permeation.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fastening method comprising:
    orienting a component inside of a hollow plastic vessel, wherein the component contains an integral meltable material;
    positioning a magnet outside of the hollow plastic vessel, adjacent to the component, wherein the component is attracted to the magnet;
    positioning an induction coil outside of the hollow plastic vessel, adjacent to the component; and
    energizing the induction coil, wherein energizing the induction coil causes the meltable material to melt and weld, to the hollow plastic vessel.

2. The fastening method according to claim 1, wherein the component is positioned against an interior wall of the hollow plastic vessel.

3. The fastening method according to claim 1, wherein the component has a metal piece to which the magnet is attracted.

4. The fastening method according to claim 1, wherein the magnet is an electro-magnet.

5. The fastening method according to claim 1, wherein orienting the component inside of the hollow plastic vessel is orienting the component against a wall of the hollow plastic vessel.

6. A fastening method comprising:
    orienting a component inside of a hollow plastic vessel, wherein the component contains an integral meltable material;
    positioning a magnet outside of the hollow plastic vessel, adjacent to the component, wherein the component is attracted to the magnet;
    positioning an induction coil outside of the hollow plastic vessel, adjacent to the component; and
    energizing the induction coil, wherein energizing the induction coil causes the meltable material to melt and weld, to the hollow plastic vessel.

7. The fastening method according to claim 6, wherein the component is positioned against an interior wall of the hollow plastic vessel.

8. The fastening method according to claim 7, wherein the component has a metal piece to which the magnet is attracted.

9. The fastening method according to claim 8, wherein the magnet is an electro-magnet.

10. The fastening method according to claim 9, wherein orienting the component inside of the hollow plastic vessel is orienting the component against a wall of the hollow plastic vessel.

11. A fastening method comprising:
    providing a metal disk to a first component;
    providing the first component with a meltable material;
    inserting the first component through a hole defined by a wall of a hollow vessel, wherein the inserting is from an exterior of the vessel to an interior of the vessel;
    positioning the first component against an interior wall of the hollow vessel;

orienting an electro-magnet about the exterior of the vessel, wherein the orienting of the electro-magnet is opposite the first component, which is on the interior of the hollow vessel;

orienting an induction coil about the electro-magnet such that the induction coil encircles the electra-magnet;

energizing the electra-magnet and attracting the metal disk of the component against the interior wall of the vessel; and energizing the induction coil so that the meltable material welds to the vessel wall.

12. The fastening method according to claim 11, further comprising:

energizing the electra-magnet until the first component and the hollow vessel are at a temperature equal to their surrounding air temperature.

13. The fastening method according to claim 11, wherein the electra-magnet attracts the metal disk of the first component equilaterally.

14. The fastening method according to claim 11, wherein the meltable material contains metal fibers.

15. The fastening method according to claim 11, wherein the meltable material is attached to the first component as a separate component.

* * * * *